United States Patent
Ogasahara

(10) Patent No.: US 9,608,732 B2
(45) Date of Patent: Mar. 28, 2017

(54) OPTICAL TRANSMITTER, OPTICAL COMMUNICATION SYSTEM, AND OPTICAL COMMUNICATION METHOD

(71) Applicant: Daisaku Ogasahara, Tokyo (JP)

(72) Inventor: Daisaku Ogasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 14/379,545

(22) PCT Filed: Feb. 13, 2013

(86) PCT No.: PCT/JP2013/000757
§ 371 (c)(1),
(2) Date: Aug. 19, 2014

(87) PCT Pub. No.: WO2013/125176
PCT Pub. Date: Aug. 29, 2013

(65) Prior Publication Data
US 2015/0030330 A1    Jan. 29, 2015

(30) Foreign Application Priority Data
Feb. 21, 2012    (JP) .................. 2012-035400

(51) Int. Cl.
H04B 10/00    (2013.01)
H04B 10/548    (2013.01)
(Continued)

(52) U.S. Cl.
CPC ....... H04B 10/548 (2013.01); H04B 10/5053 (2013.01); H04B 10/5561 (2013.01);
(Continued)

(58) Field of Classification Search
CPC .............. H04B 10/548; H04B 10/5053; H04B 10/6166; H04B 10/613; H04B 10/614; H04B 10/5561; H04J 14/002; H04J 14/06
See application file for complete search history.

(56) References Cited

U.S. PATENT DOCUMENTS 7,272,271 B2 * 9/2007 Kaplan ................... G02F 1/225
359/246
8,050,351 B2 * 11/2011 Cho ........................ G02F 1/225
332/103
(Continued)

FOREIGN PATENT DOCUMENTS

JP    2011-133894 A    7/2011
JP    2011-155579 A    8/2011

OTHER PUBLICATIONS

Meng Yan et al., "Adaptive Blind Equalization for Coherent Optical BPSK System", ECOC 2010, Th.9.A.4, IEEE, Sep. 19-23, 2010, Torino, Italy, pp. 1-3. Cited in ISR.

(Continued)

Primary Examiner — Danny Leung

(57) ABSTRACT

It becomes difficult to regenerate transmitting signals depending on modulation systems for the optical phase modulation in a polarization multiplexed optical communication system employing the optical digital coherent communication system, therefore, an optical transmitter according to an exemplary aspect of the invention includes first optical quadrature modulation means for performing a phase modulation on a first continuous light beam and outputting a first transmitting light beam; second optical quadrature modulation means for performing a phase modulation on a second continuous light beam belonging in the same frequency band as that of the first continuous light beam and outputting a second transmitting light beam; optical phase difference adding means for adding an optical phase differ- (Continued)

ence varying temporally between the first transmitting light beam and the second transmitting light beam; and polarization multiplexing means for polarization-multiplexing the first transmitting light beam and the second transmitting light beam in the state where their polarizations are made to be orthogonal to each other and outputting a polarization multiplexed transmitting light beam.

16 Claims, 8 Drawing Sheets

(51) Int. Cl.
  *H04J 14/06* (2006.01)
  *H04B 10/50* (2013.01)
  *H04B 10/556* (2013.01)
  *H04B 10/61* (2013.01)
  *H04J 14/00* (2006.01)

(52) U.S. Cl.
  CPC ......... *H04B 10/613* (2013.01); *H04B 10/614* (2013.01); *H04B 10/6166* (2013.01); *H04J 14/002* (2013.01); *H04J 14/06* (2013.01)

(56) References Cited

U.S. PATENT DOCUMENTS

| | | | | |
|---|---|---|---|---|
| 8,687,979 | B2* | 4/2014 | Xu | H04B 10/532 398/184 |
| 9,031,403 | B2* | 5/2015 | Nakashima | G01M 11/336 356/73.1 |
| 9,106,343 | B2* | 8/2015 | Chien | H04B 10/5051 |
| 2004/0096143 | A1* | 5/2004 | Shpantzer | G02B 6/12004 385/16 |
| 2010/0215374 | A1* | 8/2010 | Liu | H04B 10/5053 398/98 |
| 2011/0170869 | A1* | 7/2011 | Mandai | H04J 14/06 398/65 |
| 2011/0274436 | A1* | 11/2011 | McNicol | H04B 10/5561 398/140 |
| 2012/0224852 | A1* | 9/2012 | Liu | H04B 10/2507 398/65 |
| 2013/0011093 | A1* | 1/2013 | Goh | G02F 1/0121 385/3 |
| 2013/0136451 | A1* | 5/2013 | Yoshida | H04B 10/532 398/65 |
| 2013/0251369 | A1* | 9/2013 | Ogasahara | H04B 10/614 398/65 |

OTHER PUBLICATIONS

Ioannis Roudas, et al., "Optimal Polarization Demultiplexing for Coherent Optical Communications System", Journal of Lightwave Technology, vol. 28, No. 7, IEEE, Apr. 1, 2010, pp. 1121-1134. Cited in ISR.

International Search Report for PCT Application No. PCT/JP2013/000757, mailed on Apr. 16, 2013.

* cited by examiner

OPTICAL TRANSMITTER, OPTICAL COMMUNICATION SYSTEM, AND OPTICAL COMMUNICATION METHOD

This application is a National Stage Entry of PCT/JP2013/000757 filed on Feb. 13, 2013, which claims priority from Japanese Patent Application 2012-035400 filed on Feb. 21, 2012, the contents of all of which are incorporated herein by reference, in their entirety.

TECHNICAL FIELD

The present invention relates to optical transmitters, optical communication systems, and optical communication methods, in particular, to an optical transmitter, an optical communication system, and an optical communication method which employ a polarization multiplexing/demultiplexing system.

BACKGROUND ART

Since the traffic volume in the backbone networks has been rapidly increasing due to the growth of the Internet, an ultra-high-speed such as 100 Gbps and long-haul optical communication system has been desired. As a technology to realize such an ultra-high-speed and long-haul optical communication system, an optical phase modulation system and a polarization multiplexing/demultiplexing technology which utilize a digital signal processing technology have been attracting attention.

The optical phase modulation system is not a system to perform data modulation on the light intensity of a transmitting laser beam just like a conventional optical intensity modulation system, but a system to perform data modulation on the optical phase of a transmitting laser beam. Well-known optical phase modulation systems include a binary phase shift keying (BPSK) system, a quadrature phase shift keying (QPSK) system, an 8-phase shift keying (8PSK) system, a quadrature amplitude modulation (QAM) system, and the like.

If the BPSK method is employed, one bit (for example, "0" and "1") is allocated to two kinds of optical phases (for example, 90 degrees and 270 degrees). FIG. 7 illustrates an example of a constellation diagram for optical signals having modulated by the BPSK system. If the QPSK method is employed, two bits (for example, "00", "01", "11", and "10") are allocated to four kinds of optical phases (for example, 45 degrees, 135 degrees, 225 degrees, and 315 degrees) respectively. In this case, since two bits can be allocated to a single kind of the optical phase, it is possible to reduce the symbol rate in the QPSK system to one half of the symbol rate in the optical intensity modulation system (that is, a bit rate).

As mentioned above, it is possible in the multilevel optical phase modulation system to reduce a symbol rate (baud rate) by allocating a plurality of bits to a single symbol. Since this enables the operation speed of each electric device to decrease, it can be expected to reduce the manufacturing cost of a communication device. If the BPSK system is employed, it is impossible to obtain the effect of reducing a symbol rate because a single bit is allocated to only one type of optical phase. Because of a large distance between symbols, however, it is possible to obtain a large tolerance for phase noise due to the spontaneous emission light in an optical amplifier and a nonlinear optical effect.

The BPSK system, therefore, is suitable for the ultra-long-haul optical transmission such as an intercontinental transmission.

In order to receive the signal light modulated by optical phase modulation, an optical coherent system is employed. In the optical coherent system, the signal light and the laser light having the frequency almost identical to that of the signal light (called local oscillation light) are combined in an optical element called a 90-degree hybrid, the output of which is received by a photo detector. Here, for the sake of simplicity, it is assumed that the polarization state of the signal light and the local oscillation light is in the same linear polarization. If the optical coherent system is employed, the alternating-current component of electric signals output from the photo detector becomes beat signals of the signal light and the local oscillation light. The amplitude of the beat signal is proportional to the light intensity of the signal light and the local oscillation light. And the phase of the beat signal becomes the difference in the optical phase between the signal light and the local oscillation light if the carrier frequency of the signal light and the optical frequency of the local oscillation light are the same. Moreover, if the optical phase of the local oscillation light is the same as the optical phase of the laser light which is input into an optical modulator at a transmission end, the phase of the beat signal becomes equal to the optical phase which has been applied to the laser light at the transmission end. It is possible, therefore, to demodulate transmitting data by converting the phase of the beat signal into a bit sequence using a symbol mapping.

In an actual communication device, however, the value of the carrier frequency of the optical signal is not completely in accord with that of the optical frequency of the local oscillation light. Moreover, the optical phase of the local oscillation light in the optical receiver does not necessarily correspond to the optical phase of the laser light input into the optical modulator in the optical transmitter. It is necessary, therefore, to compensate the influence of an optical phase deviation of the difference in the optical phase between the signal light input into the optical modulator in the optical transmitter and the local oscillation light, and the influence of an optical carrier frequency deviation of the difference between the carrier frequency of the signal light and the optical frequency of the local oscillation light. It is possible to perform a process for compensating the optical phase deviation and the optical carrier frequency deviation by using a digital signal processing technology.

The polarization multiplexing/demultiplexing technology has been attracting attention as another technology to realize the ultra-high-speed optical communication system. In the polarization multiplexing/demultiplexing technology, two independent optical signals whose carrier waves are located in the same frequency band and polarization states are orthogonal to each other are multiplexed in the optical transmitter. And then the two independent optical signals are demultiplexed from received signals in the optical receiver. This makes it possible to realize a double transmission speed. Since a symbol rate (baud rate) of the optical signal becomes half adversely in such case, it is possible to reduce the operation speed of electric devices. The polarization multiplexing/demultiplexing technology, therefore, makes it possible to reduce the manufacturing cost of a communication device.

By combining the above-mentioned optical phase modulation system and the polarization multiplexing/demultiplexing technology, it is possible to realize an ultra-high-speed and long-haul optical communication system which can transmit signals at 100 Gbps. A technology has been proposed by which a process for compensating the optical carrier frequency deviation and the optical phase deviation, and a process for demultiplexing multiplexed signals into two independent optical signals (polarization demultiplexing processing) are performed by means of the digital signal processing technology, and the demodulation is performed with a high degree of accuracy. Such a method is called an optical digital coherent communication system (see patent literature 1, for example). It is possible to realize the above-mentioned digital signal processing by means of a digital signal processing circuit which is implemented in a large scale integration (LSI) or the like.

Next, the transmitting and receiving process in an ultra-high-speed optical communication system employing the optical digital coherent communication system will be described in detail. FIG. 4 illustrates a block diagram of a related optical transmitter 300 in a polarization multiplexed optical communication system employing the optical digital coherent communication system. A laser oscillator 310 emits a continuous light with a predetermined optical frequency. The continuous light is split into two continuous light beams in a polarization maintaining optical splitter 320, and input into two optical quadrature modulators 331 and 332, respectively. Driving signal generators 341 and 342 generate driving signals from transmission bit sequences. The optical quadrature modulators 331 and 332 perform phase modulation on the continuous light by the driving signals. A polarization multiplexer 360 multiplexes the output signal from the optical quadrature modulator 331 and the output signal from the optical quadrature modulator 332 in a state where the polarization states are orthogonal to each other, and outputs a multiplexed signal as polarization multiplexed transmitting light to an optical transmission line. The related optical transmitter 300 with above configuration is called an optical quadrature modulator and can be available for any optical phase modulation system. Without being limited to this configuration, it is also possible to employ a configuration of an optical transmitter which is specialized for each of optical phase modulation systems other than the optical quadrature modulation system.

FIG. 5 illustrates a block diagram of a related optical receiver 400 in the polarization multiplexed optical communication system employing the optical digital coherent communication system. The related optical receiver 400 receives a received optical signal through an optical transmission line. Local oscillation light with approximately the same optical frequency as the carrier frequency of the received optical signal is input into a 90-degree hybrid 410 together with the received optical signal. The 90-degree hybrid 410 demultiplexes the received optical signal into optical signal components, each of which has a polarization state parallel to each of two polarization axes orthogonal to each other, and outputs four optical signals in total composed of real part components and imaginary part components of the respective optical signal components. These four optical signals are converted by four optical detectors 421 to 424 into four analog electric signals, which are then converted into four digital electric signals by four analog-digital converters (ADC) 431 to 434. The digital electric signals output from the analog-digital converters (ADC) 431 to 434 are converted into digital electric signals which are sampled at a symbol rate of the received optical signal by a re-sampling unit (not illustrated), and then, they are input into a polarization demultiplexing processor 440. The polarization demultiplexing processor 440 extracts two independent polarization multiplexed optical signals on the basis of the four input digital electric signals. Optical carrier frequency deviation/optical phase deviation compensators 451 and 452 compensate an optical phase rotation in the extracted optical signals which is caused by the optical carrier frequency deviation and the optical phase deviation between the received optical signal and the local oscillation light. Finally, symbol decision units 461 and 462 demodulate them into an original transmission bit sequence.

According to the above-mentioned polarization multiplexed optical communication system employing the optical digital coherent communication system, it is possible to realize an ultra-high-speed and long-haul optical communication system which can transmit signals at 100 Gbps.

CITATION LIST

Patent Literature

Patent Literature 1: Japanese Patent Application Laid-Open Publication No. 2011-155579 (paragraphs [0049] to [0052] and [0070] to [0075], and FIGS. 7 and 10)

DISCLOSURE OF INVENTION

Problem to be Solved by the Invention

First, the operation of the polarization demultiplexing processor 440 used in the related optical receiver 400 will be described. FIG. 6 illustrates a configuration of the related polarization demultiplexing processor 440. The polarization demultiplexing processor 440 includes filter units 441 to 444 and filter coefficient updating units 445 and 446. An input signal 1 input into the polarization demultiplexing processor 440 is a signal based on an optical signal having the polarization state parallel to one of two polarization axes which are orthogonal to each other in the 90-degree hybrid 410. That is to say, it is a digital electric signal represented by a complex number whose real part component is a digital electric signal output from the ADC 431 shown in FIG. 5, whose imaginary part component is a digital electric signal output from the ADC 432. Similarly, an input signal 2 input into the polarization demultiplexing processor 440 is a signal based on an optical signal having the polarization state parallel to the other of two polarization axes which are orthogonal to each other in the 90-degree hybrid 410. That is to say, it is a digital electric signal represented by a complex number whose real part component is a digital electric signal output from the ADC 433 shown in FIG. 5, whose imaginary part component is a digital electric signal output from the ADC 434.

An output signal 1 and an output signal 2 output from the polarization demultiplexing processor 440 shown in FIG. 6 are digital electric signals based on two independent optical signals which are polarization-multiplexed in the optical transmitter 300.

The filter units 441 to 444 included in the polarization demultiplexing processor 440 perform filtering processes on the input signal 1 and the input signal 2 by using filter coefficients, each of which is independently set in each filter unit. Subsequently, the polarization demultiplexing processor 440 outputs an output signal 1 which is obtained as a sum of the outputs of the filter unit 441 and the filter unit 443, and an output signal 2 which is obtained as a sum of the outputs of the filter unit 442 and the filter unit 444. It is possible to use commonly-used finite impulse response (FIR) filters for the filter units 441 to 444. Without being limited to this, it is also possible to use a frequency domain equalization (FDE) technology by which the equalization processing is performed in a frequency domain.

The filter coefficient updating unit 445 updates filter coefficients of the filter unit 441 and the filter unit 443 according to a predetermined algorithm. Similarly, the filter coefficient updating unit 446 updates filter coefficients of the filter unit 442 and the filter unit 444. As the algorithm by which the filter coefficient updating units 445, 446 update the filter coefficients of the filter units 441 to 444, a constant modulus algorithm (CMA) has been widely used (see PTL 1, for example). In the CMA, the polarization demultiplexing is performed by controlling the coefficients of the filter units 441 to 444 adaptively so that the envelope of the extracted optical signals, that is, the light intensity may become constant.

Next, a case will be described where the filter coefficients are updated by using the CMA. An error function defined in the CMA is expressed in following formula (1).

$$J_x(W,W^H)=E[(r_x^2-|E'_x|^2)^2], J_y(W,W^H)=E[(r_y^2-|E'_y|^2)^2] \quad (1)$$

$J_x$ (W, $W^H$) represents an error function for the output signal 1, and $J_y$ (W, $W^H$) represents an error function for the output signal 2. Here, W represents a square matrix with 2×2 in size, and the elements of the matrix W in the first row and first column ($w_{xx}$), the first row and second column ($w_{yx}$), the second row and first column ($w_{xy}$), and the second row and second column ($w_{yy}$) represent the filter coefficients of the filter units 441 to 444, respectively. The matrix W is a matrix which is called Jones matrix and expresses the characteristics of an optical transmission line. The matrix $W^H$ represents a Hermitian conjugate of the matrix W.

In the above description, for the sake of simplicity, the number of taps of the filter unit is set at one, but it can be set at more than one. In formula (1), $r_x$ and $r_y$ represent target values of the amplitudes of the output signal 1 and the output signal 2, respectively, and $E_x'$ and $E_y'$ represent the output signal 1 and the output signal 2, respectively. E [x] represents an expected value of x.

The filter coefficient updating unit 445 sequentially updates the filter coefficients of the filter unit 441 and the filter unit 443 so that the error function $J_x$ for the output signal 1 may be minimized. The filter coefficient updating unit 446 sequentially updates the filter coefficients of the filter unit 442 and the filter unit 444 so that the error function $J_y$ for the output signal 2 may be minimized.

Following formulae (2) to (4) are used in order that the filter coefficient updating units 445 and 446 may update the respective filter coefficients on the basis of the error function used in the CMA shown in formula (1)

$$W_{k+1}^H = W_k^H + \mu \nabla J(W, W^H) \quad (2)$$
$$= W_k^H + \mu \frac{\partial J(W, W^H)}{\partial W}$$
$$= W_k^H + \mu \begin{pmatrix} \frac{\partial J}{\partial w_{xx}} & \frac{\partial J}{\partial w_{xy}} \\ \frac{\partial J}{\partial w_{yx}} & \frac{\partial J}{\partial w_{yy}} \end{pmatrix}$$

$$\nabla J(W, W^H) = \frac{\partial J}{\partial W} \quad (3)$$
$$= \begin{pmatrix} \frac{\partial J}{\partial w_{xx}^*} & \frac{\partial J}{\partial w_{yx}^*} \\ \frac{\partial J}{\partial w_{xy}^*} & \frac{\partial J}{\partial w_{yy}^*} \end{pmatrix}$$
$$= -2E\left[\begin{pmatrix} e_{xx} & e_{xy} \\ e_{yx} & e_{yy} \end{pmatrix}\right]$$

$$e_{xx} = (r_x^2 - |E'_x|^2)E_x E'^*_x \quad (4)$$
$$e_{xy} = (r_x^2 - |E'_x|^2)E_y E'^*_x$$
$$e_{yx} = (r_y^2 - |E'_y|^2)E_x E'^*_y$$
$$e_{yy} = (r_y^2 - |E'_y|^2)E_y E'^*_y$$

It can be understood from the formulae (2) to (4) that, in the CMA, the filter coefficients of the filter units 441 to 444 are updated as follows. That is to say, the filter coefficients of the filter units 441 to 444 are updated so that symbol points on a constellation diagram showing the output signals of the polarization demultiplexing processor 440 may move to the circumference of a circle with radius $r_x$ or $r_y$ in the direction (or the reverse direction) of the origin. Here, "μ" in formula (2) is a parameter to stabilize a feedback control by adjusting the amount updated of the filter coefficients. That is to say, "μ" is a parameter to determine a processing speed of the polarization demultiplexing processing. Instantaneous values are generally used in place of expected values in order to calculate the amount updated of the filter coefficients.

As mentioned above, it becomes possible to demultiplex and extract digital electric signals based on two independent optical signals from the received optical signals by the operation of the filter units 441 to 444 and the filter coefficient updating units 445 and 446 using CMA which are included in the polarization demultiplexing processor 440.

The above-mentioned related polarization demultiplexing technology, however, has a problem described below. The processing for updating filter coefficients employing the CMA is effective in demultiplexing the polarization of polarization multiplexed optical signals which are generated by using the optical phase modulation system such as QPSK system or 8PSK system in which there are four or more symbol points and each symbol point is located on the same circumference of a circle. There has been a problem, however, that it is impossible to demultiplex the polarization of polarization multiplexed optical signals which are generated by using the optical phase modulation system in which the number of symbol points is two or each symbol point is not located on the same circumference of a circlet, which makes it impossible to regenerate an original transmission bit sequence. Above-mentioned optical phase modulation systems include the BPSK system, 16QAM system or the like.

The problem of the related polarization demultiplexing processing technology employing the CMA will be further described below. As mentioned above, in the CMA, the filter coefficients of the filter units 441 to 444 are updated so that symbol points on a constellation diagram showing the output signals of the polarization demultiplexing processor 440 may move to the circumference of a circle with a predetermined radius in the direction (or the reverse direction) of the origin. If there is a fixed optical phase difference between two independent optical signals, however, the filter coefficients are not updated in the CMA so that the optical phase difference between the optical signals may be reduced to zero "0". It is impossible, therefore, to obtain two symbol points which are observed in an ideal constellation for the BPSK system shown in FIG. 7. That is to say, if the BPSK system is employed in a case where there is a fixed optical phase difference between the two independent optical signals, symbol points are converged on four symbol points which are observed in the constellation shown in FIG. 8. As a result, a false bit sequence is regenerated in the symbol decision.

As mentioned above, there has been a problem that it becomes difficult to regenerate transmitting signals depending on modulation systems for the optical phase modulation in a related polarization multiplexed optical communication system employing the optical digital coherent communication system.

The object of the present invention is to provide an optical transmitter, an optical communication system, and an optical communication method which solve the problem mentioned above that it becomes difficult to regenerate transmitting signals depending on modulation systems for the optical phase modulation in a polarization multiplexed optical communication system employing the optical digital coherent communication system.

Means for Solving a Problem

An optical transmitter according to an exemplary aspect of the invention includes first optical quadrature modulation means for performing a phase modulation on a first continuous light beam and outputting a first transmitting light beam; second optical quadrature modulation means for performing a phase modulation on a second continuous light beam belonging in the same frequency band as that of the first continuous light beam and outputting a second transmitting light beam; optical phase difference adding means for adding an optical phase difference varying temporally between the first transmitting light beam and the second transmitting light beam; and polarization multiplexing means for polarization-multiplexing the first transmitting light beam and the second transmitting light beam in the state where their polarizations are made to be orthogonal to each other and outputting a polarization multiplexed transmitting light beam.

An optical communication system according to an exemplary aspect of the present invention includes an optical transmitter and an optical receiver, wherein the optical transmitter includes first optical quadrature modulation means for performing a phase modulation on a first continuous light beam and outputting a first transmitting light beam; second optical quadrature modulation means for performing a phase modulation on a second continuous light beam belonging in the same frequency band as that of the first continuous light beam and outputting a second transmitting light beam; optical phase difference adding means for adding an optical phase difference varying temporally between the first transmitting light beam and the second transmitting light beam; and polarization multiplexing means for polarization-multiplexing the first transmitting light beam and the second transmitting light beam in the state where their polarizations are made to be orthogonal to each other and outputting a polarization multiplexed transmitting light beam; and an optical receiver includes a 90-degree optical hybrid receiving the polarization multiplexed transmitting light beam and local oscillation light with approximately the same optical frequency as that of each of the first continuous light beam and the second continuous light beam, and outputting a first received light beam and a second received light beam whose polarization direction is orthogonal to the polarization direction of the first received light beam; photoelectrical conversion means for photoelectrically converting the first received light beam and the second received light beam and outputting a first received signal and a second received signal, respectively; and signal processing means for demodulating the first received signal and the second received signal by performing signal processing on the first received signal and the second received signal.

An optical communication method according to an exemplary aspect of the present invention includes performing a phase modulation on a first continuous light beam and outputting a first transmitting light beam; performing a phase modulation on a second continuous light beam belonging in the same frequency band as that of the first continuous light beam and outputting a second transmitting light beam; adding an optical phase difference varying temporally between the first transmitting light beam and the second transmitting light beam; polarization-multiplexing the first transmitting light beam and the second transmitting light beam in the state where their polarizations are made to be orthogonal to each other and outputting a polarization multiplexed transmitting light beam; receiving the polarization multiplexed transmitting light beam and local oscillation light with approximately the same optical frequency as that of each of the first continuous light beam and the second continuous light beam, and outputting a first received light beam and a second received light beam whose polarization direction is orthogonal to the polarization direction of the first received light beam; photoelectrically converting the first received light beam and the second received light beam and outputting a first received signal and a second received signal, respectively; and demodulating the first received signal and the second received signal by performing signal processing on the first received signal and the second received signal.

Effect of the Invention

According to an optical transmitter, an optical communication system, and an optical communication method of the present invention, it becomes possible to regenerate transmitting signals without depending on modulation systems for the optical phase modulation in a polarization multiplexed optical communication system employing the optical digital coherent communication system.

DESCRIPTION OF EMBODIMENTS

The exemplary embodiments of the present invention will be described with reference to drawings below.

The First Exemplary Embodiment

Figure 1:
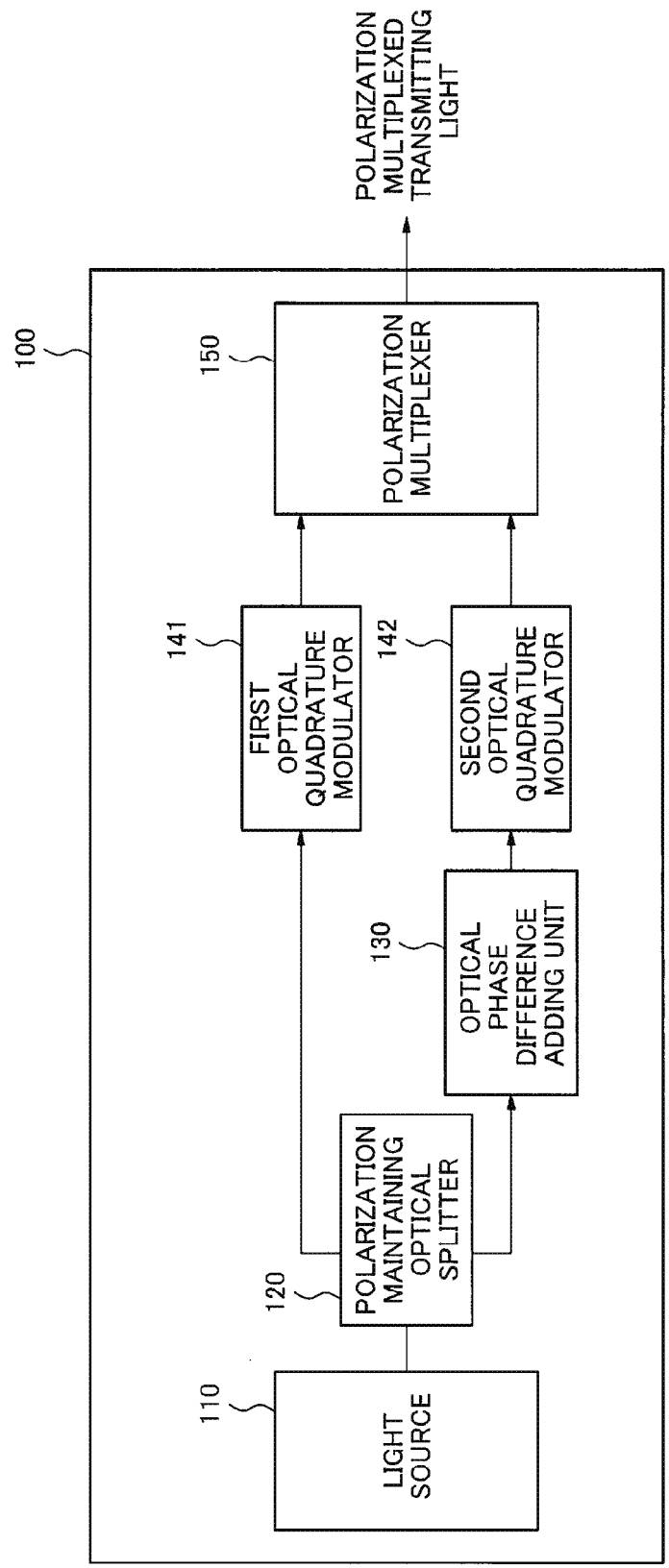
FIG. 1 is a block diagram illustrating a configuration of an optical transmitter in accordance with the first exemplary embodiment of the present invention.

FIG. 1 is a block diagram illustrating a configuration of an optical transmitter 100 in accordance with the first exemplary embodiment of the present invention. The optical transmitter 100 is used in a polarization multiplexed optical communication system employing the optical digital coherent communication system. As shown in FIG. 1, the optical transmitter 100 includes a light source 110, a polarization maintaining optical splitter 120, an optical phase difference adding unit 130, a first optical quadrature modulator 141, a second optical quadrature modulator 142, and a polarization multiplexer 150.

The polarization maintaining optical splitter 120 splits a continuous light beam transmitted by the light source 100 into a first continuous light beam and a second continuous light beam. The optical phase difference adding unit 130 adds an optical phase difference varying temporally between the first continuous light beam and the second continuous light beam which belong in the same frequency band. The first optical quadrature modulator 141 performs a phase modulation on the first continuous light beam and outputs a first phase modulated transmitting light beam (a first transmitting light beam). The second optical quadrature modulator 142 performs a phase modulation on the second continuous light beam and outputs a second phase modulated transmitting light beam (a second transmitting light beam). The polarization multiplexer 150 polarization-multiplexes the first phase modulated transmitting light beam and the second phase modulated transmitting light beam so that their polarization states may be orthogonal to each other, and outputs a polarization multiplexed transmitting light beam.

An optical phase modulator can be used as the optical phase difference adding unit 130. It is possible to temporally vary the optical phase of the second continuous light beam by inputting the second continuous light beam into the optical phase modulator and temporally varying driving electric signals supplied to the optical phase modulator.

FIG. 1 illustrates a configuration in which the optical phase difference adding unit is located on any one of a path for the first continuous light beam and a path for the second continuous light beam. But it is not limited to this, and it is also acceptable that the optical phase difference adding unit 130 is configured to include a first optical phase difference adding unit and a second optical phase difference adding unit, and that the first optical phase difference adding unit is located on the path for the first continuous light beam, for example, at the just front or back of the first optical quadrature modulator 141, and the second optical phase difference adding unit is located on the path for the second continuous light beam.

It is possible to use an optical modulator specializing in generating signals based on only the BPSK system as the first optical quadrature modulator 141 and the second optical quadrature modulator 142.

As mentioned above, in the optical transmitter 100 of the present exemplary embodiment, an optical phase difference varying temporally is added between the first continuous light and the second continuous light. Thus, if any one of the first phase modulated transmitting light and the second phase modulated transmitting light is used as the base, the optical phase of the other phase modulated transmitting light is not fixed and varies at a constant speed. As a result, even if the transmitting light has been phase-modulated employing the BPSK system, it is possible to perform the polarization demultiplexing processing employing the CMA on the transmitting light at a receiving side. As mentioned above, according to the optical transmitter 100 of the present exemplary embodiment, it becomes possible to regenerate transmitting signals without depending on modulation systems for the optical phase modulation in a polarization multiplexed optical communication system employing the optical digital coherent communication system.

The Second Exemplary Embodiment

Figure 2:
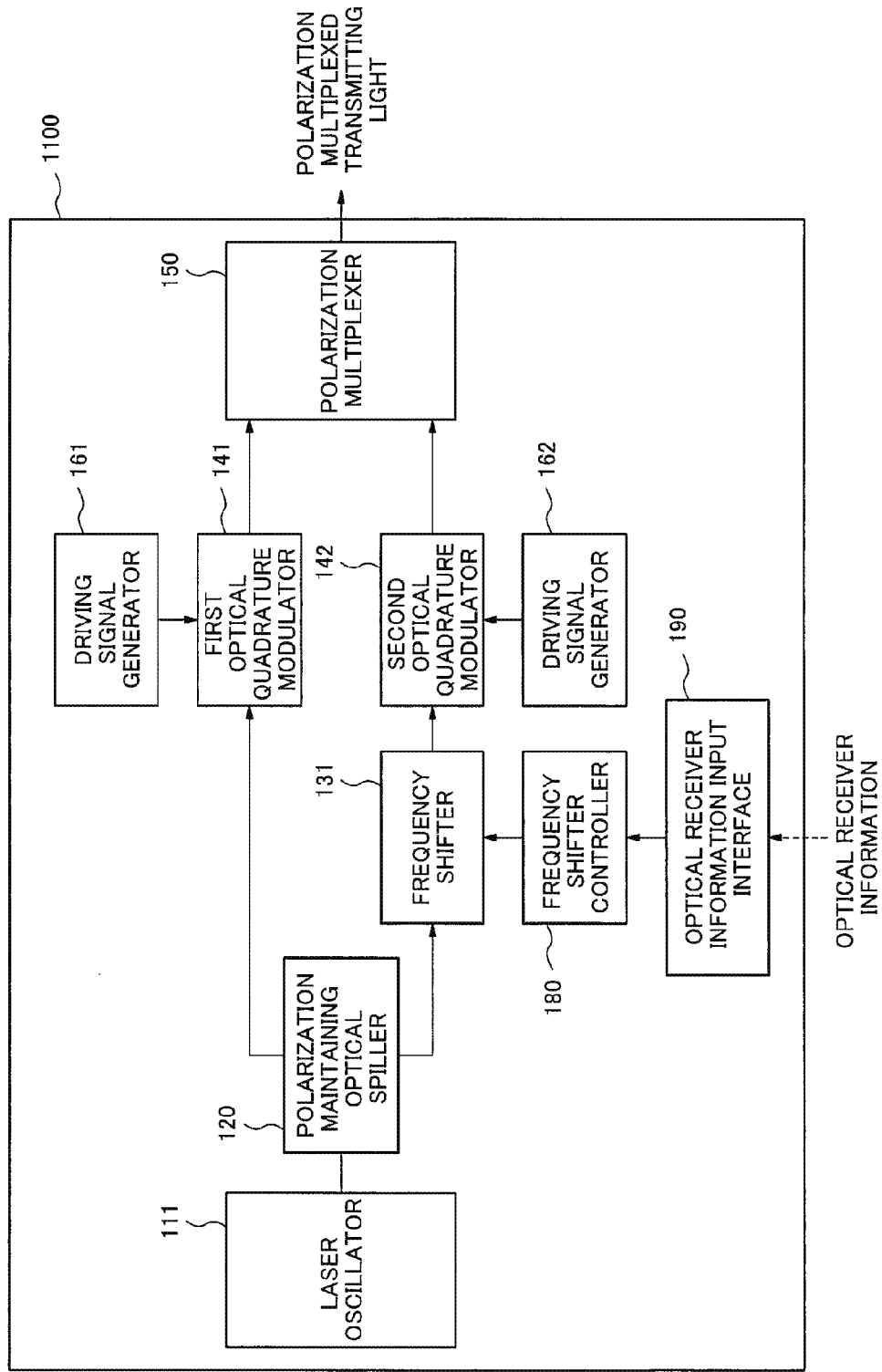
FIG. 2 is a block diagram illustrating a configuration of an optical transmitter included in an optical communication system in accordance with the second exemplary embodiment of the present invention.
Figure 3:
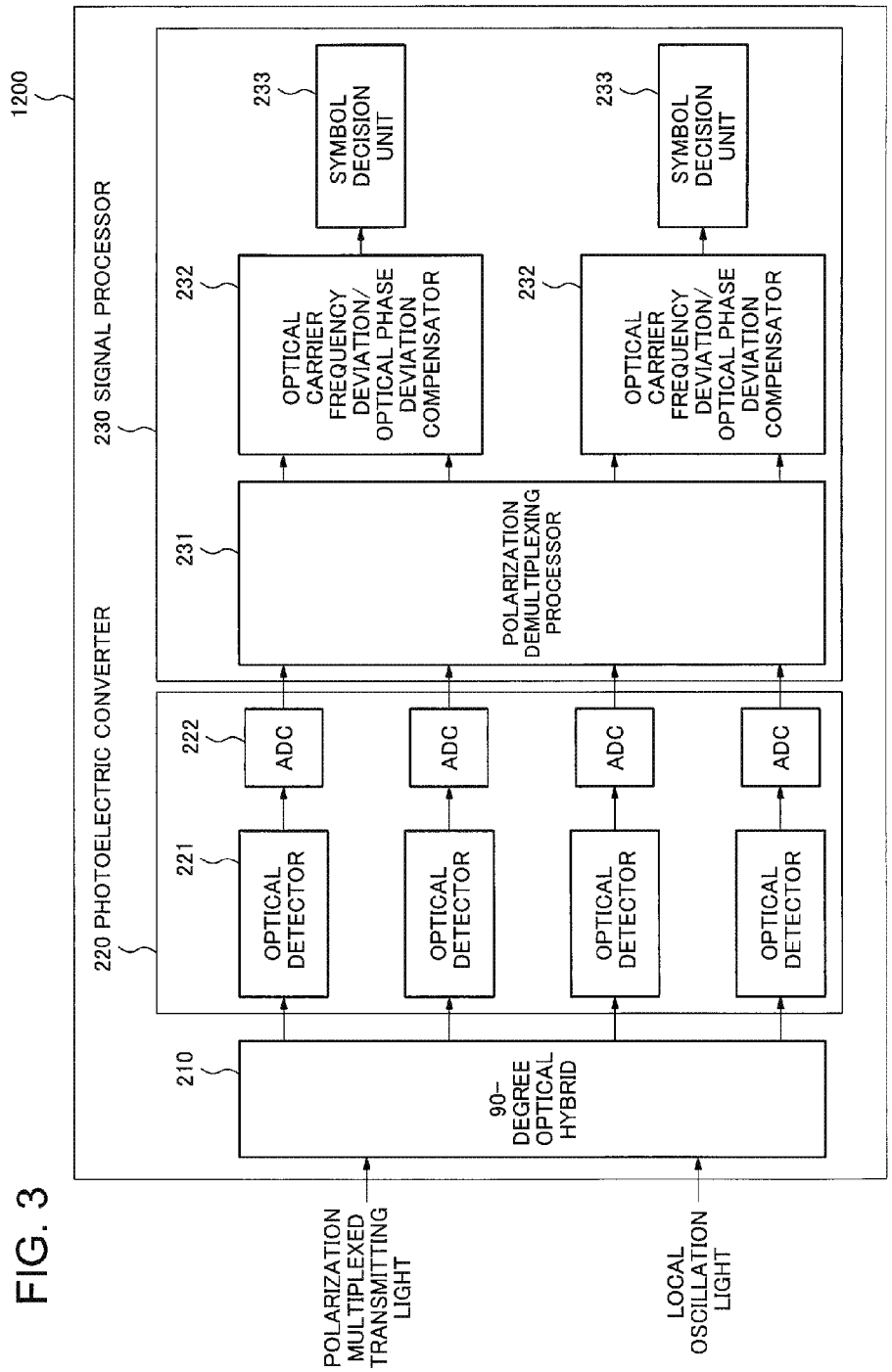
FIG. 3 is a block diagram illustrating a configuration of an optical receiver included in an optical communication system in accordance with the second exemplary embodiment of the present invention.
Figure 4:
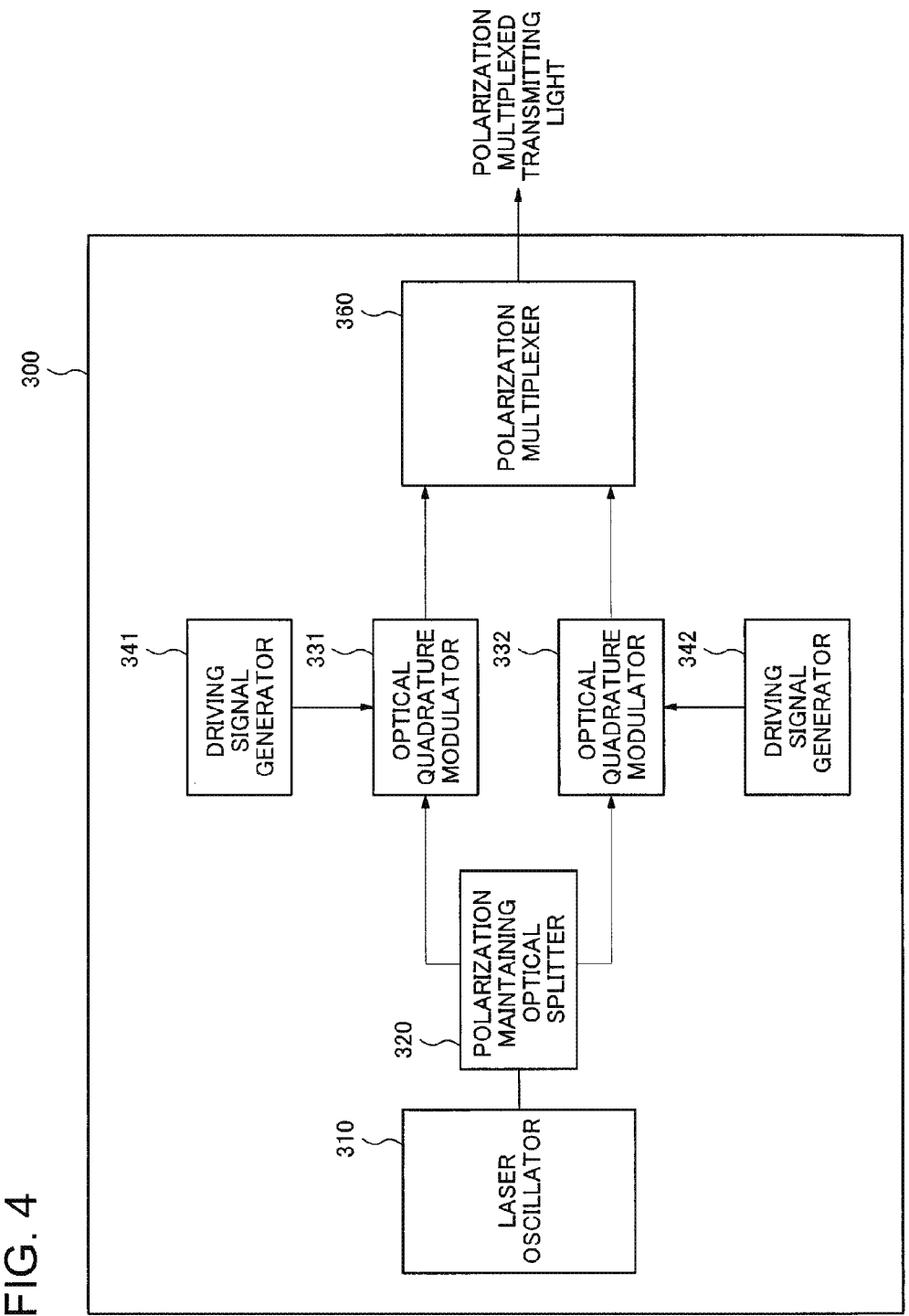
FIG. 4 is a block diagram illustrating a configuration of a related optical transmitter in a polarization multiplexed optical communication system employing the optical digital coherent communication system.
Figure 5:
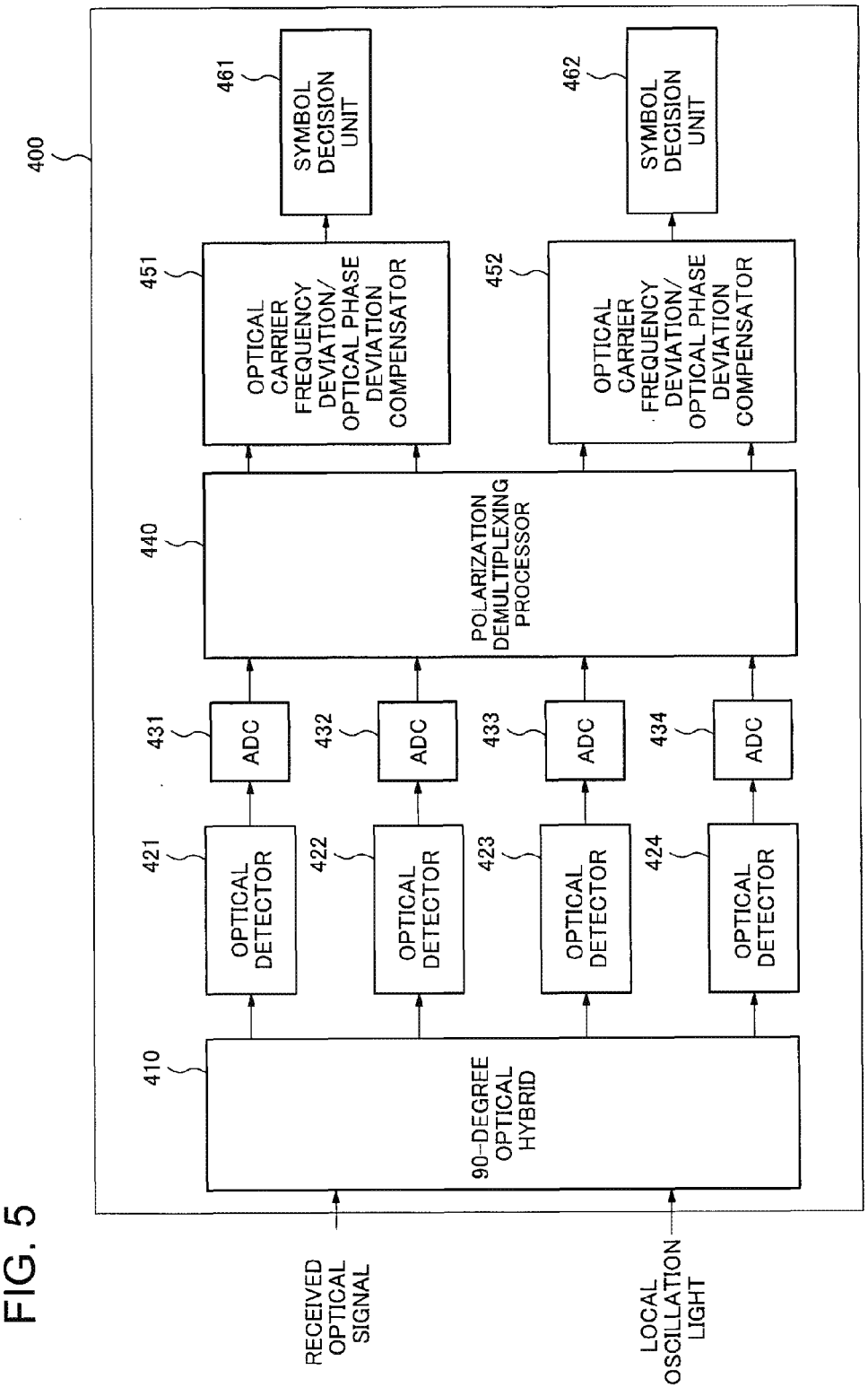
FIG. 5 is a block diagram illustrating a configuration of a related optical receiver in a polarization multiplexed optical communication system employing the optical digital coherent communication system.
Figure 6:
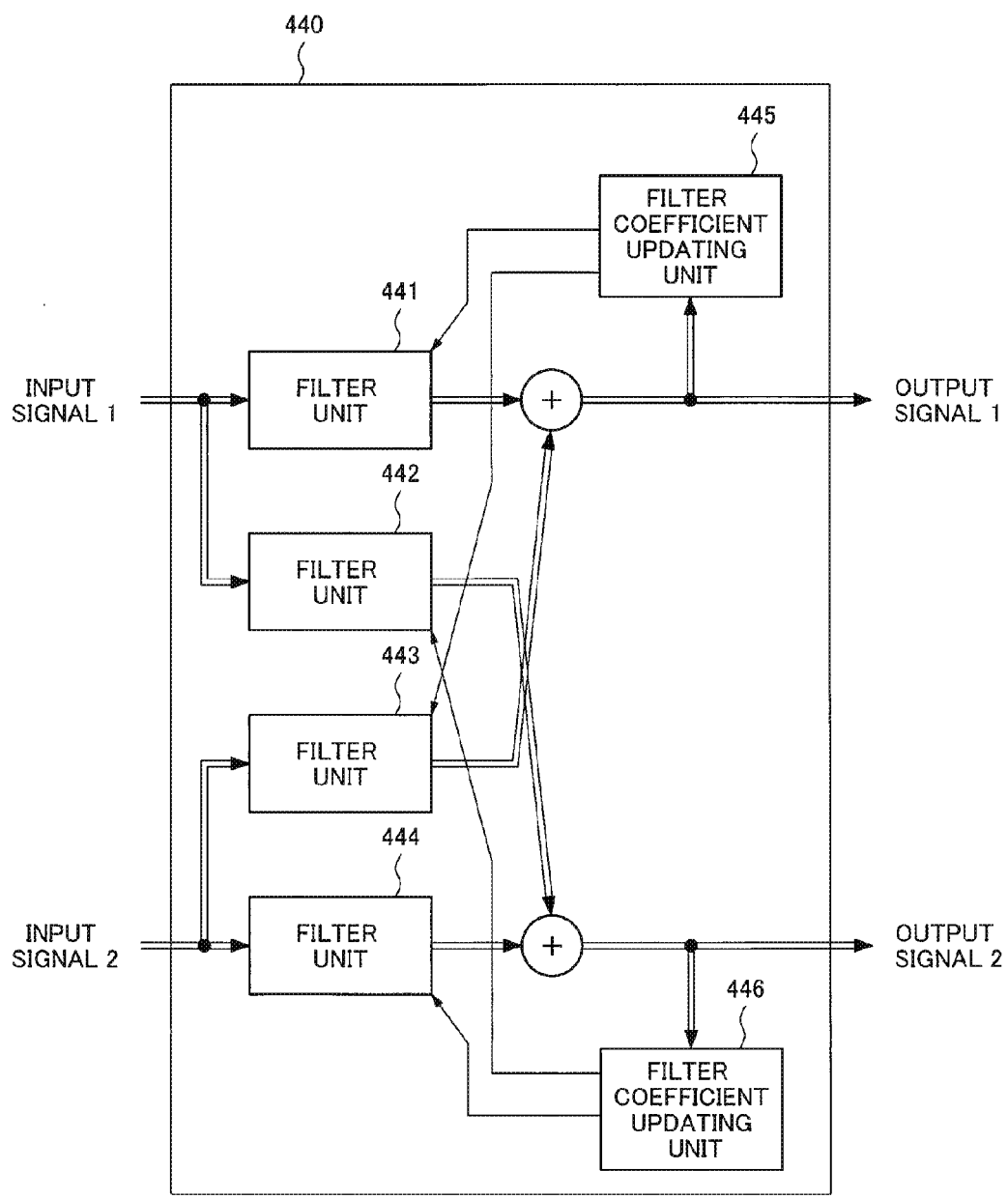
FIG. 6 is a block diagram illustrating a configuration of a related polarization demultiplexing processor used in a related optical receiver.
Figure 7:
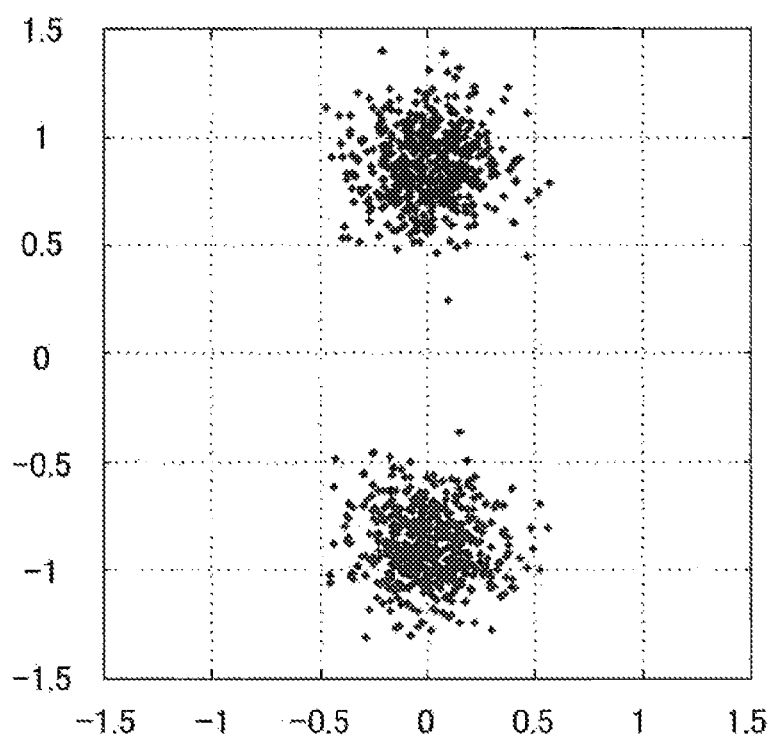
FIG. 7 is a diagram illustrating an example of a constellation of optical signals modulated by the BPSK method system.
Figure 8:
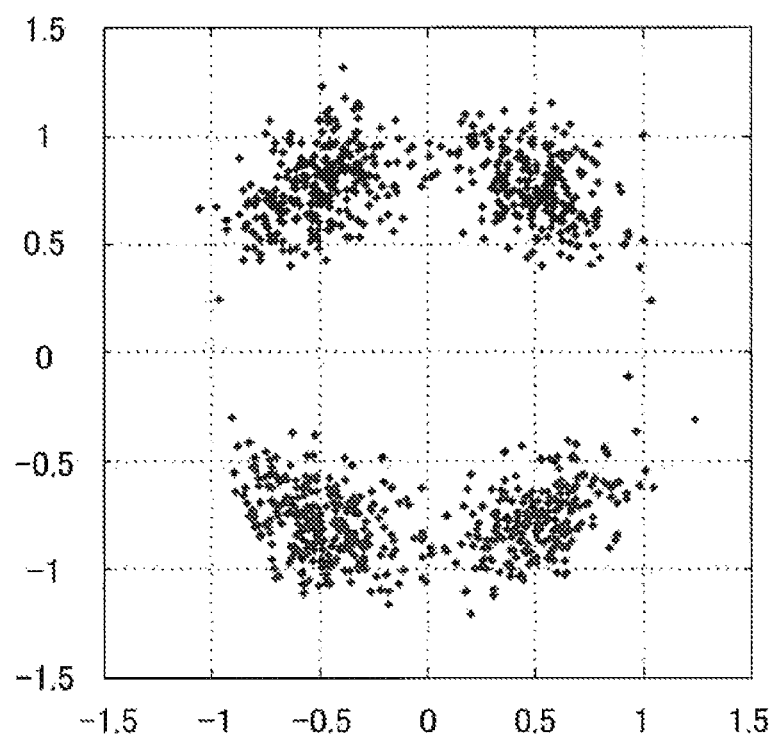
FIG. 8 is a diagram illustrating another example of a constellation of optical signals modulated by the BPSK system.

Next, the second exemplary embodiment of the present invention will be described. FIG. 2 is a block diagram illustrating a configuration of an optical transmitter 1100 included in an optical communication system in accordance with the present exemplary embodiment. FIG. 3 is a block diagram illustrating a configuration of an optical receiver 1200 included in the optical communication system in accordance with the present exemplary embodiment. The optical communication system in accordance with the present exemplary embodiment is a polarization multiplexed optical communication system employing the optical digital coherent communication system. The optical transmitter 1100 transmits polarization multiplexed transmitting light. The optical receiver 1200 receives the polarization multiplexed transmitting light beam, performs the coherent detection of the received light, and demodulates detected signals by means of the digital signal processing.

As shown in FIG. 2, the optical transmitter 1100 includes a laser oscillator 111 as the light source, the polarization maintaining optical splitter 120, a frequency shifter 131 as the optical phase difference adding unit, the first optical quadrature modulator 141, the second optical quadrature modulator 142, and the polarization multiplexer 150.

The continuous light beam transmitted from the laser oscillator 111 is split into two continuous light beams in the polarization maintaining optical splitter 120. One of the continuous light beams split in two is input into the first optical quadrature modulator 141. The other passes through the frequency shifter 131 and then is input into the second optical quadrature modulator 142. The first optical quadrature modulator 141 and the second optical quadrature modulator 142 perform the phase modulation on the continuous light by using driving signals generated by driving signal generators 161 and 162. Here, the driving signal generators 161 and 162 generate driving signals from transmission bit sequences.

In the present exemplary embodiment, the optical transmitter 1100 is configured to include the optical quadrature modulators 141 and 142. The polarization multiplexer 150 multiplexes the output signal from the first optical quadrature modulator 141 and the output signal from the second optical quadrature modulator 142 in the state where their polarization states are orthogonal to each other, and outputs the multiplexed output signal as polarization multiplexed transmitting light to an optical transmission line.

The optical transmitter 1100 of the present exemplary embodiment is configured to further include a frequency shifter controller 180 as an optical phase difference controller which controls a temporal variation of an optical phase difference added by the frequency shifter 131, and an optical receiver information input interface 190. The optical receiver information input interface 190 obtains optical receiver information including a signal processing speed in the optical receiver 1200 and sends it to the frequency shifter controller 180. The frequency shifter controller 180 controls the temporal variation of the optical phase difference added by the frequency shifter 131 on the basis of the signal processing speed.

Next, the operation of the optical transmitter 1100 in accordance with the present exemplary embodiment will be described. The laser oscillator 111 outputs a continuous light beam, and the polarization maintaining optical splitter 120 splits the continuous light beam in two. The frequency shifter 131 shifts the optical frequency of one of the continuous light beams split in two. At this time, the frequency shifter 131 shifts the optical frequency by the value which is directed by the frequency shifter controller 180. Each of the first optical quadrature modulator 141 and the second optical quadrature modulator 142 modulates the optical phase of the continuous light by means of the BPSK system. The polarization multiplexer 150 generates the polarization multiplexed transmitting light by polarization multiplexing a phase modulated transmitting light beam with another phase modulated transmitting light beam.

The frequency shifter 131 can be realized by inputting linearly time-variable driving signals into an optical quadrature modulator. It is not limited to this; it is possible to use a device as the frequency shifter 131 if the device can temporally vary an optical phase of a optical signal. FIG. 2 illustrates the configuration in which the frequency shifter 131 is located between the polarization maintaining optical splitter 120 and the second optical quadrature modulator 142, but it is not limited to this, a configuration is also acceptable in which the frequency shifter 131 is located on the path between the second optical quadrature modulator 142 and the polarization multiplexer 150. FIG. 2 illustrates a configuration in which the frequency shifter 131 is located on the path for one continuous light beam and shifts the optical frequency, but it is not limited to this, a configuration is also acceptable in which the frequency shifters 131 are located on both paths for the two continuous light beams and shift the optical frequencies by different values, respectively.

Next, the optical receiver 1200 included in the optical communication system in accordance with the present exemplary embodiment will be described. FIG. 3 illustrates a configuration of the optical receiver 1200. The optical receiver 1200 includes a 90-degree optical hybrid 210, a photoelectric converter 220, and a signal processor 230. The 90-degree optical hybrid 210 receives polarization multiplexed transmitting light and local oscillation light with approximately the same optical frequency as that of the continuous light in the optical transmitter 1100, and outputs a first received light beam and a second received light beam whose polarization direction is orthogonal to the polarization direction of the first received light beam. Since the first received light and the second received light include real part components and imaginary part components respectively, the 90-degree optical hybrid 210 outputs four optical signals in total.

The photoelectric converter 220 photoelectrically converts the first received light and the second received light and outputs a first received signal and a second received signal, respectively. The photoelectric converter 220 can be configured to include an optical detector 221 and an analog-digital converter (ADC) 222. The signal processor 230 demodulates the first received signal and the second received signal by performing the signal processing on them.

It is possible to adopt a configuration similar to that of the related optical receiver 400 for the optical receiver 1200. That is to say, the signal processor 230 can be configured to include a polarization demultiplexing processor 231, an optical carrier frequency deviation/optical phase deviation compensator 232, and a symbol decision unit 233. The polarization demultiplexing processor 231 extracts two independent polarization multiplexed optical signals on the basis of four input digital electric signals. The optical carrier frequency deviation/optical phase deviation compensator 232 compensates an optical phase rotation in the extracted optical signals which is caused by the optical carrier frequency deviation and the optical phase deviation between the received optical signal and the local oscillation light. The symbol decision unit 233 demodulates the optical signals into an original transmission bit sequence.

Next, the shift amount of the optical frequency of the continuous light in the optical transmitter 1100 will be described. It is possible to be configured to control the shift amount of the optical frequency of the continuous light on the basis of the signal processing speed in the signal processor 230 of the optical receiver 1200. Specifically, it is preferable to determine the shift amount on the basis of the optical receiver information including the processing speeds of the polarization demultiplexing processor 231 and the optical carrier frequency deviation/optical phase deviation compensator 232 which are included in the signal processor 230. The reason is as follows.

If the processing speed in the polarization demultiplexing processor 231 (specifically, the value of $\mu$ in formula (2)) is too fast, the influence of the temporal variation of the optical phase due to the optical frequency shift becomes relatively smaller. This leads to the execution of the polarization demultiplexing processing similar to that without the optical frequency shift, and consequently it becomes impossible to perform the polarization demultiplexing processing for polarization multiplexed optical signals using the BPSK system.

In contrast, if the shift amount of the optical frequency is too large, it becomes impossible to demodulate the optical signals because the shift amount exceeds the range of the frequency deviation amount which the optical carrier frequency deviation/optical phase deviation compensator 232 can compensate.

On the other hand, the optical communication system in accordance with the present exemplary embodiment is configured to send the optical receiver information of the optical receiver 1200 to the frequency shifter controller 180 through the optical receiver information input interface 190 included in the optical transmitter 1100. In order to send the optical receiver information from the optical receiver 1200 to the optical transmitter 1100, a control plane of the optical communication system can be used, for example. Here, the optical receiver information includes the processing speeds of the polarization demultiplexing processor 231 and the optical carrier frequency deviation/optical phase deviation compensator 232. And the optical communication system is configured in which the frequency shifter controller 180 determines an appropriate shift amount of the optical frequency on the basis of the optical receiver information, and then sets the shift amount of the optical frequency of the continuous light in the frequency shifter 131.

Next, the polarization demultiplexing processing in the optical communication system in accordance with the present exemplary embodiment will be described in more detail. If the optical frequency of one of two independent optical signals is shifted in the optical transmitter 1100 and the optical phase of one optical signal is used as the base, the optical phase of the other optical signal is not fixed and varies at a constant speed. Thus, the direction of a vector of the amount updated of the filter coefficients in the filter unit composing the polarization demultiplexing processor 231 in the optical receiver 1200 varies temporally although it is originally fixed. As a result, it becomes possible to perform the polarization demultiplexing processing because the optical phase difference between two independent optical signals can be compensated by using the CMA. But, if the processing speed in the polarization demultiplexing processor 231 is too fast, or the shift amount of the optical frequency is too small, symbol points on a constellation diagram move to the circumference of a unit circle before the optical phase difference between the optical signals is compensated, and the value of the error function in formula (1) becomes zero "0". For that reason, it becomes impossible to perform the polarization demultiplexing processing. It is necessary, therefore, to determine the shift amount of the optical frequency or the optical frequency deviation between the optical signals on the basis of the processing speed in the polarization demultiplexing processor 231.

Specifically, the processing speed in the polarization demultiplexing processor 231 depends on the value of $\mu$ in formula (2). A numerical value of about $1 \times 10^{-3}$ can be used as the value of $\mu$, for example. The processing speed in the optical carrier frequency deviation/optical phase deviation compensator 232 depends on a modulation system, a symbol rate, an algorithm and the like. As the algorithm, an algorithm can be used which can deal with a frequency shift within approximately 3 GHz for the polarization multiplexed QPSK signal at 100 Gbps, for example. It is desirable to set the shift amount of the optical frequency faster than the processing speed in the polarization demultiplexing processor 231 and slower than the processing speed in the optical carrier frequency deviation/optical phase deviation compensator 232. The magnitude of the shift amount of the optical frequency can be set at an order of several hundreds of megahertz, typically.

As mentioned above, according to the optical communication system of the present exemplary embodiment, it is possible to perform the polarization demultiplexing processing using the CMA at the receiving side even though optical signals are polarization multiplexed optical signals employing the BPSK system. Therefore, it becomes possible to regenerate transmitting signals without depending on modulation systems for the optical phase modulation in a polarization multiplexed optical communication system employing the optical digital coherent communication system.

It has been described in the above-mentioned exemplary embodiments that the optical transmitter obtains the optical receiver information from the optical receiver. But, it is not limited to this, it is also acceptable for the optical transmitter to be configured to include a storage unit for storing the optical receiver information in advance, and to control the temporal variation of the optical phase difference on the basis of the optical receiver information stored in the storage unit.

The present invention is not limited to the above-mentioned exemplary embodiments and can be variously modified within the scope of the invention described in the claims. It goes without saying that these modifications are also included in the scope of the present invention.

This application is based upon and claims the benefit of priority from Japanese Patent Application No. 2012-035400, filed on Feb. 21, 2012, the disclosure of which is incorporated herein in its entirety by reference.

DESCRIPTION OF THE CODES 100, 1100 optical transmitter
110 light source
111 laser oscillator
120 polarization maintaining optical splitter
130 optical phase difference adding unit
131 frequency shifter
141 first optical quadrature modulator
142 second optical quadrature modulator
150 polarization multiplexer
161, 162 driving signal generator
180 frequency shifter controller
190 optical receiver information input interface
1200 optical receiver
210 90-degree optical hybrid
220 photoelectric converter
221 optical detector
222 analog-digital converter (ADC)
230 signal processor
231 polarization demultiplexing processor
232 optical carrier frequency deviation/optical phase deviation compensator
233 symbol decision unit
300 related optical transmitter
310 laser oscillator
320 polarization maintaining optical splitter
331, 332 optical quadrature modulator
341, 342 driving signal generator
360 polarization multiplexer
400 related optical receiver
410 90-degree hybrid
421, 424 optical detector
431, 434 analog-digital converter (ADC)
440 polarization demultiplexing processor
441, 444 filter unit
445, 446 filter coefficient updating unit
451, 452 optical carrier frequency deviation/optical phase deviation compensator
461, 462 symbol decision unit

What is claimed is:

1. An optical transmitter, comprising:
a first optical quadrature modulator performing a phase modulation on a first continuous light beam and outputting a first transmitting light beam;
a second optical quadrature modulator performing a phase modulation on a second continuous light beam belonging in the same frequency band as that of the first continuous light beam and outputting a second transmitting light beam;
an optical phase difference adding unit adding an optical phase difference varying temporally between the first transmitting light beam and the second transmitting light beam; and
a polarization multiplexer polarization-multiplexing the first transmitting light beam and the second transmitting light beam in the state where their polarizations are made to be orthogonal to each other and outputting a polarization multiplexed transmitting light beam, wherein the optical phase difference adding unit comprises a frequency deviation adding unit making a frequency deviation arise between the first transmitting light beam and the second transmitting light beam.

2. The optical transmitter according to claim 1, wherein the first optical quadrature modulator and the second optical quadrature modulator perform the phase modulation employing a binary phase shift keying system.

3. An optical transmitter, comprising:
a first optical quadrature modulator performing a phase modulation on a first continuous light beam and outputting a first transmitting light beam;
a second optical quadrature modulator performing a phase modulation on a second continuous light beam belonging in the same frequency band as that of the first continuous light beam and outputting a second transmitting light beam;
an optical phase difference adding unit adding an optical phase difference varying temporally between the first transmitting light beam and the second transmitting light beam;
a polarization multiplexer polarization-multiplexing the first transmitting light beam and the second transmitting light beam in the state where their polarizations are made to be orthogonal to each other and outputting a polarization multiplexed transmitting light beam; and
an optical phase difference controller controlling a temporal variation of the optical phase difference.

4. The optical transmitter according to claim 3, wherein the optical phase difference controller controls the temporal variation of the optical phase difference on the basis of a signal processing speed in an optical receiver receiving the polarization multiplexed transmitting light beam.

5. The optical transmitter according to claim 1, wherein the optical phase difference adding unit is located on any one of a path for the first continuous light beam and a path for the second continuous light beam, and adds the optical phase difference varying temporally between the first continuous light beam and the second continuous light beam.

6. An optical communication system, comprising:
an optical transmitter and an optical receiver,
wherein the optical transmitter comprises
a first optical quadrature modulator performing a phase modulation on a first continuous light beam and outputting a first transmitting light beam;
a second optical quadrature modulator performing a phase modulation on a second continuous light beam belonging in the same frequency band as that of the first continuous light beam and outputting a second transmitting light beam;
an optical phase difference adding unit adding an optical phase difference varying temporally between the first transmitting light beam and the second transmitting light beam; and
a polarization multiplexer polarization-multiplexing the first transmitting light beam and the second transmitting light beam in the state where their polarizations are made to be orthogonal to each other and outputting a polarization multiplexed transmitting light beam; and
an optical receiver comprises
a 90-degree optical hybrid receiving the polarization multiplexed transmitting light beam and local oscillation light with approximately the same optical frequency as that of each of the first continuous light beam and the second continuous light beam, and outputting a first received light beam and a second received light beam whose polarization direction is orthogonal to the polarization direction of the first received light beam;
a photoelectrical converter photoelectrically converting the first received light beam and the second received light beam and outputting a first received signal and a second received signal, respectively; and
a signal processor demodulating the first received signal and the second received signal by performing signal processing on the first received signal and the second received signal,
wherein the optical transmitter further comprises an optical phase difference controller controlling a temporal variation of the optical phase difference, and the optical phase difference controller controls the temporal variation of the optical phase difference on the basis of a signal processing speed of the signal processing means.

7. An optical communication system, comprising:
an optical transmitter and an optical receiver,
wherein the optical transmitter comprises
a first optical quadrature modulator performing a phase modulation on a first continuous light beam and outputting a first transmitting light beam;
a second optical quadrature modulator performing a phase modulation on a second continuous light beam belonging in the same frequency band as that of the first continuous light beam and outputting a second transmitting light beam;
an optical phase difference adding unit adding an optical phase difference varying temporally between the first transmitting light beam and the second transmitting light beam; and
a polarization multiplexer polarization-multiplexing the first transmitting light beam and the second transmitting light beam in the state where their polarizations are made to be orthogonal to each other and outputting a polarization multiplexed transmitting light beam; and
an optical receiver comprises:
a 90-degree optical hybrid receiving the polarization multiplexed transmitting light beam and local oscillation light with approximately the same optical frequency as that of each of the first continuous light beam and the second continuous light beam, and outputting a first received light beam and a second received light beam whose polarization direction is orthogonal to the polarization direction of the first received light beam;
a photoelectrical converter photoelectrically converting the first received light beam and the second received light beam and outputting a first received signal and a second received signal, respectively; and
a signal processor demodulating the first received signal and the second received signal by performing signal processing on the first received signal and the second received signal,
wherein the signal processor polarization-demultiplexes the polarization multiplexed transmitting light beam on the basis of coefficients which are updated by using a constant modulus algorithm.

8. An optical communication method, comprising:
performing a phase modulation on a first continuous light beam and outputting a first transmitting light beam;

performing a phase modulation on a second continuous light beam belonging in the same frequency band as that of the first continuous light beam and outputting a second transmitting light beam;

adding an optical phase difference varying temporally between the first transmitting light beam and the second transmitting light beam;

polarization-multiplexing the first transmitting light beam and the second transmitting light beam in the state where their polarizations are made to be orthogonal to each other and outputting a polarization multiplexed transmitting light beam;

receiving the polarization multiplexed transmitting light beam and local oscillation light with approximately the same optical frequency as that of each of the first continuous light beam and the second continuous light beam, and outputting a first received light beam and a second received light beam whose polarization direction is orthogonal to the polarization direction of the first received light beam;

photoelectrically converting the first received light beam and the second received light beam and outputting a first received signal and a second received signal, respectively; and demodulating the first received signal and the second received signal by performing signal processing on the first received signal and the second received signal, wherein, in adding the optical phase difference varying temporally, a temporal variation of the optical phase difference is controlled on the basis of a signal processing speed in performing the signal processing.

9. An optical communication method, comprising:

performing a phase modulation on a first continuous light beam and outputting a first transmitting light beam;

performing a phase modulation on a second continuous light beam belonging in the same frequency band as that of the first continuous light beam and outputting a second transmitting light beam;

adding an optical phase difference varying temporally between the first transmitting light beam and the second transmitting light beam;

polarization-multiplexing the first transmitting light beam and the second transmitting light beam in the state where their polarizations are made to be orthogonal to each other and outputting a polarization multiplexed transmitting light beam;

receiving the polarization multiplexed transmitting light beam and local oscillation light with approximately the same optical frequency as that of each of the first continuous light beam and the second continuous light beam, and outputting a first received light beam and a second received light beam whose polarization direction is orthogonal to the polarization direction of the first received light beam;

photoelectrically converting the first received light beam and the second received light beam and outputting a first received signal and a second received signal, respectively; and demodulating the first received signal and the second received signal by performing signal processing on the first received signal and the second received signal, wherein the signal processing comprises a processing for polarization-demultiplexing the polarization multiplexed transmitting light beam on the basis of coefficients which are updated by using a constant modulus algorithm.

10. The optical transmitter according to claim 1, further comprising an optical phase difference controller controlling a temporal variation of the optical phase difference.

11. The optical transmitter according to claim 2, further comprising an optical phase difference controller controlling a temporal variation of the optical phase difference.

12. The optical transmitter according to claim 1,
wherein the optical phase difference adding unit is located on any one of a path for the first continuous light beam and a path for the second continuous light beam, and adds the optical phase difference varying temporally between the first continuous light beam and the second continuous light beam.

13. The optical transmitter according to claim 2,
wherein the optical phase difference adding unit is located on any one of a path for the first continuous light beam and a path for the second continuous light beam, and adds the optical phase difference varying temporally between the first continuous light beam and the second continuous light beam.

14. The optical transmitter according to claim 3,
wherein the optical phase difference adding unit is located on any one of a path for the first continuous light beam and a path for the second continuous light beam, and adds the optical phase difference varying temporally between the first continuous light beam and the second continuous light beam.

15. The optical transmitter according to claim 4,
wherein the optical phase difference adding unit is located on any one of a path for the first continuous light beam and a path for the second continuous light beam, and adds the optical phase difference varying temporally between the first continuous light beam and the second continuous light beam.

16. The optical communication system according to claim 6, wherein the signal processor polarization-demultiplexes the polarization multiplexed transmitting light beam on the basis of coefficients which are updated by using a constant modulus algorithm.

* * * * *